United States Patent
Simyon et al.

(10) Patent No.: US 7,325,036 B2
(45) Date of Patent: *Jan. 29, 2008

(54) SYSTEM AND METHOD FOR COMMAND TRANSMISSION UTILIZING AN EMAIL RETURN PATH

(75) Inventors: Jeff Simyon, Alpharetta, GA (US); David M. Placek, Duluth, GA (US); Joseph L. Kennedy, Lawrenceville, GA (US)

(73) Assignee: Wegener Communications, Inc., Duluth, GA (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/184,169

(22) Filed: Jul. 19, 2005

(65) Prior Publication Data

US 2006/0007932 A1     Jan. 12, 2006

Related U.S. Application Data

(63) Continuation of application No. 10/384,423, filed on Mar. 7, 2003, now Pat. No. 7,020,689.

(51) Int. Cl.
    *G06F 15/16* (2006.01)
(52) U.S. Cl. .......................... 709/206; 725/32
(58) Field of Classification Search ............ 340/531; 379/14, 88, 114; 725/39
    See application file for complete search history.

(56) References Cited

U.S. PATENT DOCUMENTS

| | | | |
|---|---|---|---|
| 4,985,895 A | 1/1991 | Pelkey | |
| 5,594,490 A | 1/1997 | Dawson et al. | |
| 5,754,938 A | 5/1998 | Herz et al. | 725/116 |
| 5,991,800 A | 11/1999 | Burke et al. | |
| 6,023,723 A | 2/2000 | McCormick et al. | 709/206 |
| 6,026,439 A | 2/2000 | Chowdhury et al. | |
| 6,044,205 A | 3/2000 | Reed et al. | 709/201 |
| 6,134,589 A | 10/2000 | Hultgren | 709/227 |
| 6,154,745 A | 11/2000 | Kari et al. | 707/100 |
| 6,163,809 A | 12/2000 | Buckley | |
| 6,173,330 B1 | 1/2001 | Guo et al. | |
| 6,250,930 B1 | 6/2001 | Mintz | 434/323 |
| 6,252,952 B1* | 6/2001 | Kung et al. | 379/114.1 |
| 6,272,549 B1 | 8/2001 | Daniel | |
| 6,351,524 B1* | 2/2002 | Schuster et al. | 379/88.23 |

(Continued)

OTHER PUBLICATIONS

A Scalable HTTP Server: The NCSA Prototype—Katz, Butler, McGrath (1994) www.ncsa.uiuc.edu/informationServers/Conferences/CERNwww94/www94.ncsa.ps.

(Continued)

*Primary Examiner*—Thong Vu
(74) *Attorney, Agent, or Firm*—Husch & Eppenberger LLC; Robert C. Haldiman

(57) ABSTRACT

The system supports monitoring of receiver network status by providing an email return path for receiver status information. Remote locations provide access to an internet capable LAN, which the integrated receiver decoders use to send parameter information to the central server using the internet protocol. Unit status and parameter information is sent in a binary format using standard email protocols to transfer the data. The server translates the binary data and stores the receiver status, allowing the user to browse the latest status of any receiver which has sent back a report.

29 Claims, 6 Drawing Sheets

U.S. PATENT DOCUMENTS

| | | | |
|---|---|---|---|
| 6,377,981 B1 | 4/2002 | Ollikainen et al. | 709/217 |
| 6,385,647 B1 | 5/2002 | Willis et al. | |
| 6,400,265 B1 * | 6/2002 | Saylor et al. | 340/531 |
| 6,415,329 B1 | 7/2002 | Gelman et al. | |
| 6,421,674 B1 | 7/2002 | Yoakum et al. | 707/10 |
| 6,449,634 B1 | 9/2002 | Capiel | 709/206 |
| 6,477,647 B1 | 11/2002 | Venkatraman et al. | |
| 6,487,723 B1 | 11/2002 | MacInnis | |
| 6,510,454 B1 | 1/2003 | Walukiewicz | |
| 6,516,376 B1 | 2/2003 | Christine et al. | |
| 6,714,973 B1 | 3/2004 | Heiske et al. | 709/223 |
| 6,731,323 B2 * | 5/2004 | Doss et al. | 348/14.01 |
| 6,738,808 B1 | 5/2004 | Zellner et al. | 709/223 |
| 6,792,269 B2 | 9/2004 | Boehmke | 455/424 |
| 7,089,561 B2 * | 8/2006 | Morrison et al. | 719/312 |
| 2002/0023143 A1 | 2/2002 | Stephenson et al. | |
| 2002/0040475 A1 * | 4/2002 | Yap et al. | 725/39 |
| 2002/0046407 A1 * | 4/2002 | Franco | 725/110 |
| 2002/0059256 A1 | 5/2002 | Halim et al. | |
| 2002/0065891 A1 * | 5/2002 | Malik | 709/206 |
| 2002/0069295 A1 | 6/2002 | Edwards et al. | |
| 2002/0095600 A1 | 7/2002 | Deen et al. | |
| 2002/0112076 A1 | 8/2002 | Rueda et al. | |
| 2002/0124249 A1 * | 9/2002 | Shintani et al. | 725/32 |
| 2002/0718360 | 11/2002 | Wenocur et al. | |
| 2002/0184529 A1 | 12/2002 | Wenocur et al. | |
| 2002/0199001 A1 | 12/2002 | Wenocur et al. | |
| 2002/0199096 A1 | 12/2002 | Wenocur et al. | |
| 2003/0009694 A1 | 1/2003 | Wenocur et al. | |
| 2003/0018912 A1 | 1/2003 | Boyle et al. | |
| 2003/0140107 A1 * | 7/2003 | Rezvani et al. | 709/208 |
| 2006/0059024 A1 * | 3/2006 | Bailey et al. | 705/5 |

OTHER PUBLICATIONS

Seven Techniques to Improve Email List Integrity.return path www.returnpath.net

SmartBounce, What is SmartBounce? www.smartbounce.com/what_is_2.htm.

* cited by examiner

Fig_2_

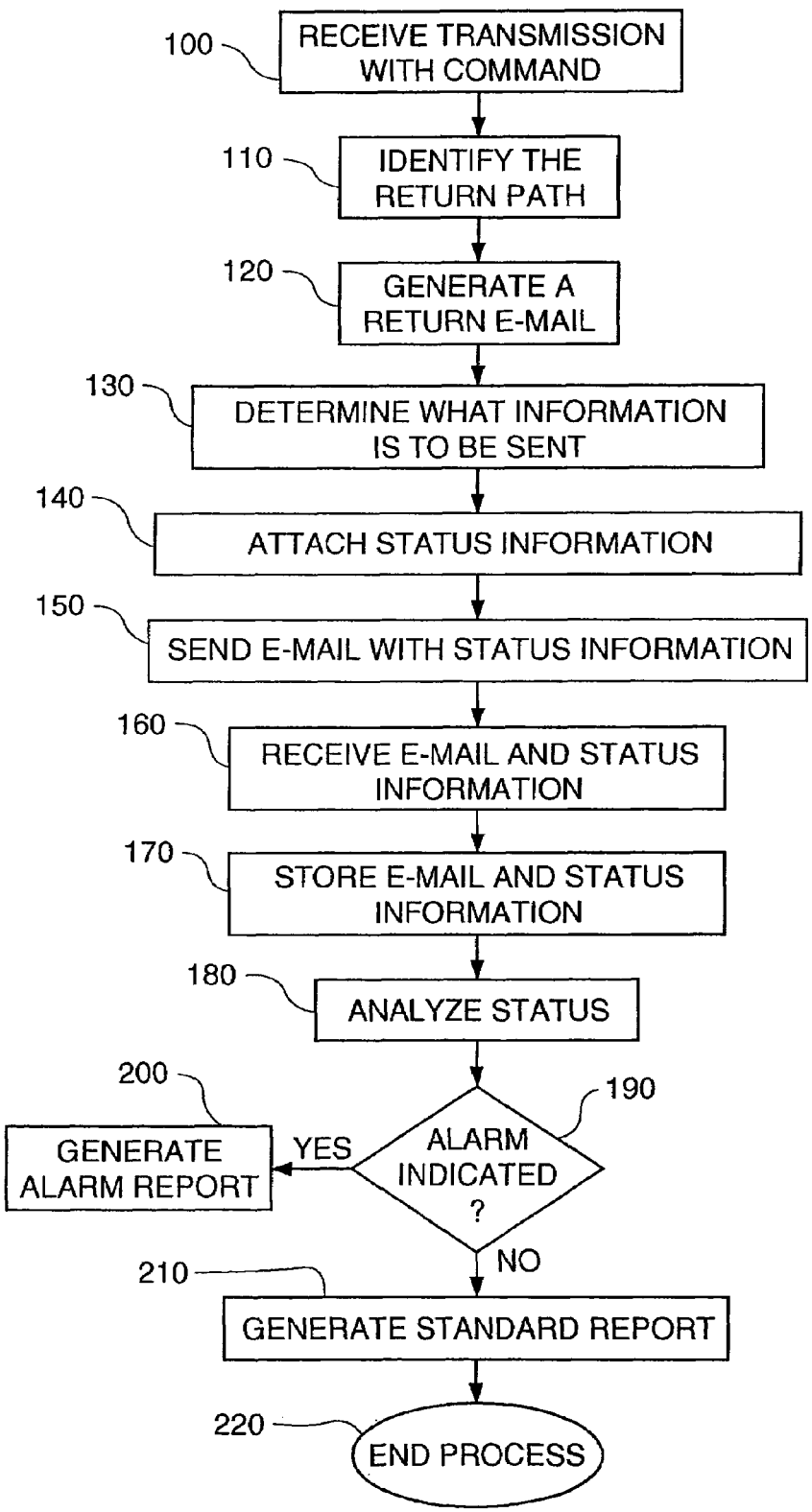

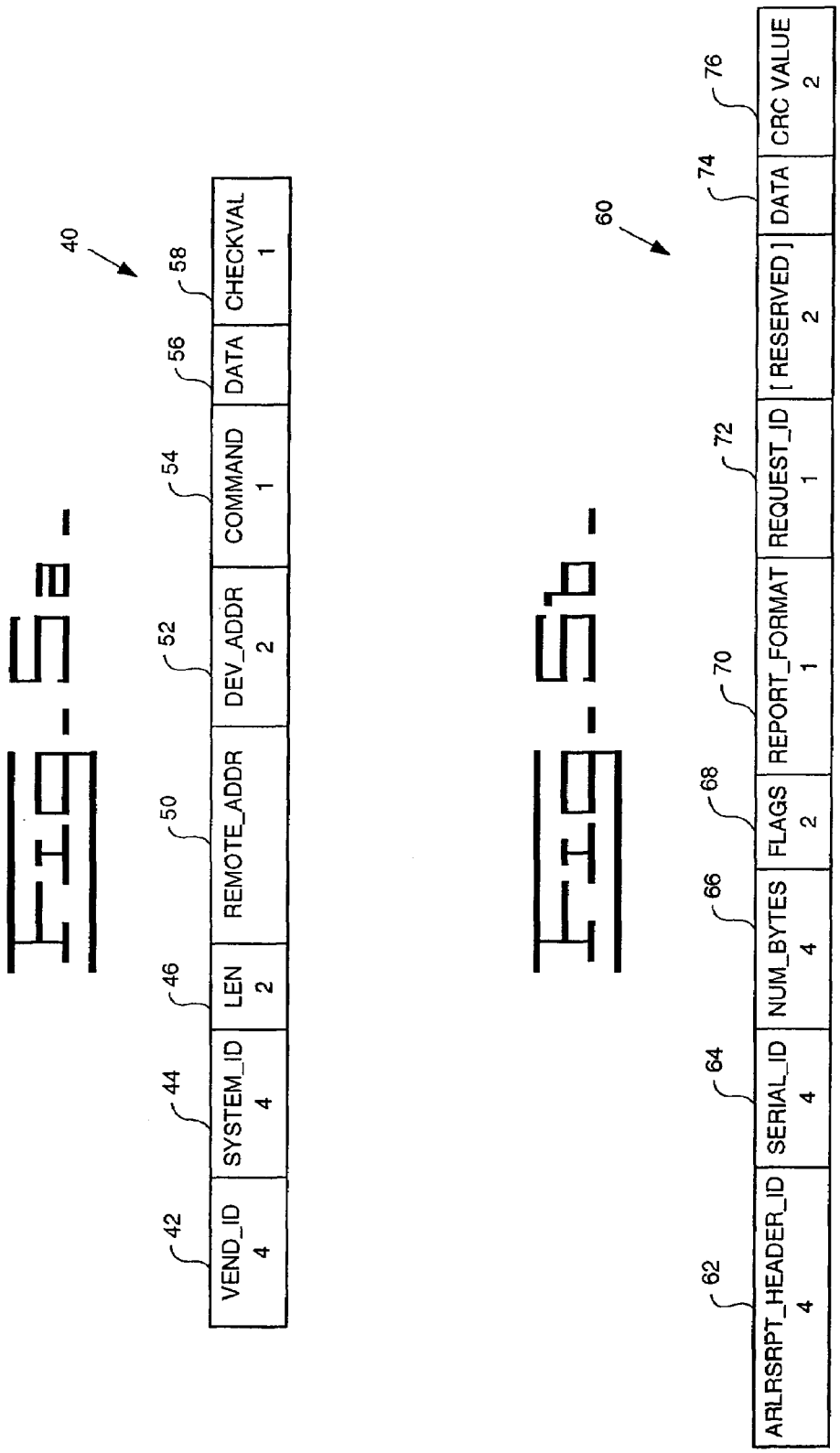

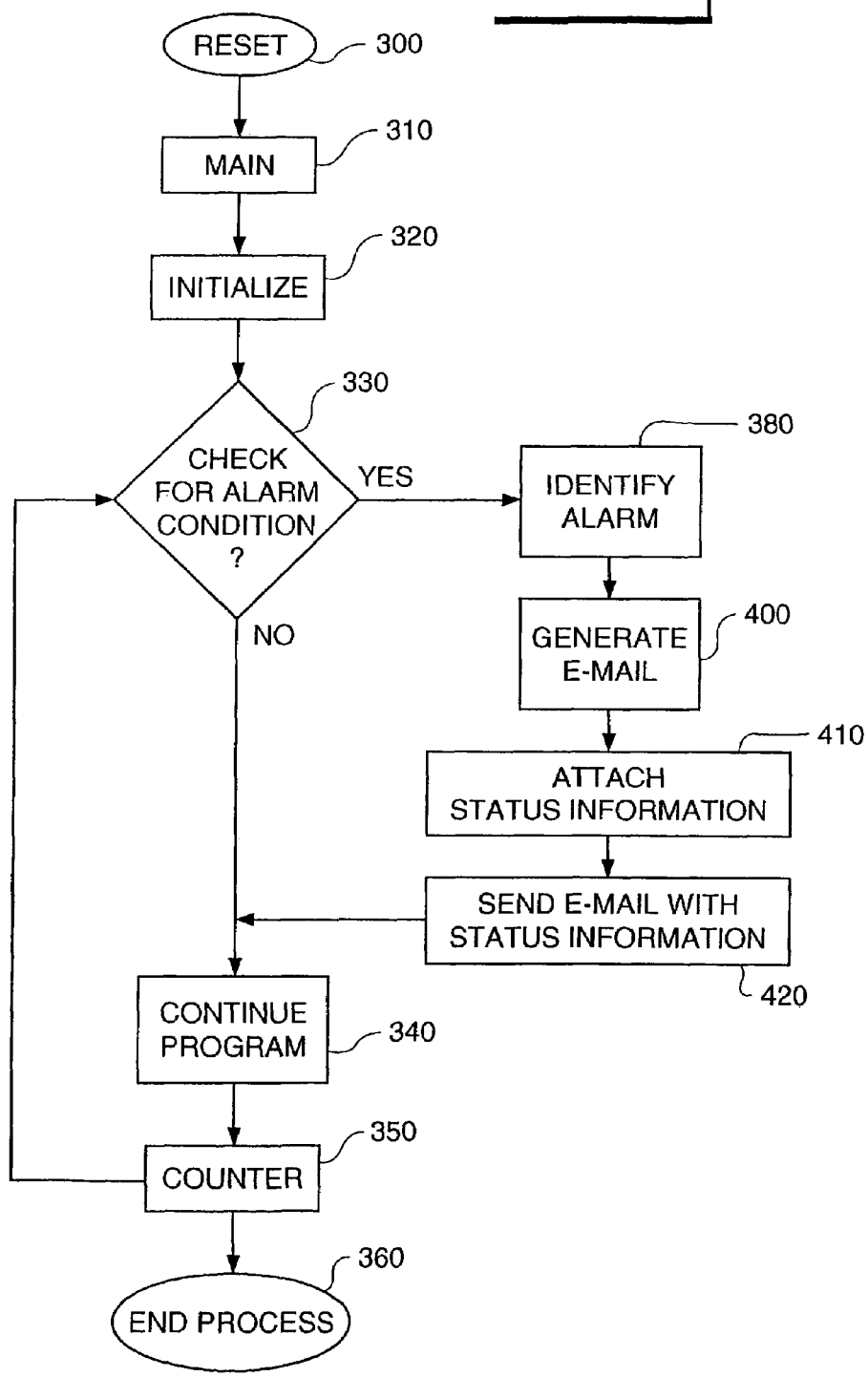

SYSTEM AND METHOD FOR COMMAND TRANSMISSION UTILIZING AN EMAIL RETURN PATH

CROSS-REFERENCE TO RELATED APPLICATIONS

This application is a continuation of U.S. patent application Ser. No. 10/384,423, filed Mar. 7, 2003, now U.S. Pat. No. 7,020,689, issued Mar. 28, 2006.

BACKGROUND OF THE INVENTION

1. Field of the Invention

This invention relates generally to multiple computer data transferring and, more particularly, to a system and method using e-mail protocols for a return path for command and control interactivity with outlying receiver sites.

2. Related Art

Large communication networks transmit content data such as audio and video programming over a wide geographical area by satellite broadcast, terrestrial broadcast, cable or Internet. One type of satellite communication system is a point to multipoint configuration wherein transmission equipment at a single, central location, for example a satellite uplink, may send data, control information, audio and video signals to hundreds or even thousands of individual locations multiple receiving stations such as satellite down links and may be geographically positioned over the entire country or any other geographic area. The data and signals from the uplink are transmitted via satellite to the downlinks virtually immediately. These point to multipoint communications networks have a variety of uses such as simultaneously switching audio and video programming for cable television networks, voice communications, sending electronic mail, or controlling equipment at physically remote outposts, as well as many other applications.

It is often necessary to obtain status information for each network device, such as a satellite receiver. This is done for any number of reasons, but primarily for the monitoring of network performance and network maintenance. One presently known method of obtaining status information for network devices includes producing physical printouts at each network device and collecting all printouts in a central location. This is a burdensome and time consuming technique. Another method is to transfer files through the use of user-defined protocols in conjunction with a dedicated server. This technique limits the network size to the quantity of devices that can be serviced by a central control system. Still another method in the arena of satellite communications is to provide extensive hardware at the uplink such that it could receive a significant amount of traffic from a multitude of network devices. This technique is not practical due to the expense of necessary hardware to allow for multiple devices to transmit status information simultaneously.

Additionally, data is often exchanged between the uplink and downlinks that are associated with computers or computer networks using the Transmission Control Protocol/Internet Protocol (TCP/IP). TCP/IP is integrated into the OSI reference model for networks wherein TCP performs the transport layer function and IP performs the network layer function. Because TCP/IP is a part of the normal network software contained within a computer system, direct use of TCP/IP will usually penetrate the firewall established for the computer system. Because of this, most computer systems severely limit the direct use of TCP/IP within their computer systems, except for certain well known applications such as electronic mail, through the use of a firewall.

A firewall is a system or group of systems that enforces an access control policy between two networks. The actual means by which this is accomplished varies widely, but in principle, the firewall can be thought of as a pair of mechanisms: one which exists to block traffic, and the other which exists to permit traffic. Generally, firewalls are configured to protect against unauthenticated interactive logins from the "outside" world. Most firewalls, however, permit email traffic through them, thereby protecting the network against any attacks other than attacks against the email service.

U.S. Pat. No. 5,594,490 to Dawson discloses a system and method for file transfer communication wherein data files are transferred in packet form from a distribution station to a plurality of receiving stations via satellite. If a receiving station detects an error in one of the packets, it requests by modem a retransmission of the particular packet. Dawson, however, does not disclose an easy and reliable means of penetrating a firewall.

U.S. Pat. No. 6,272,549 to Daniel discloses a method for using electronic mail for exchanging application data between computer systems using TCP/IP. This method builds an additional TCP/IP layer on top of an electronic mail system that may communicate between computers and thus penetrates firewalls. It does not disclose interactive communication with broadcast receivers via e-mail.

U.S. Pat. No. 6,415,329 to Gelman et al. discloses a method of communicating over a satellite link using the TCP/IP configuration. In the method, data packets are transferred from a source gateway to a first application, from the first application to a second application, and from the second application to the destination gateway. Gelman also does not disclose an easy and reliable means of penetrating a firewall.

There remains a need in the art for a return transmission path that allows for a multitude of network devices with distributed content data to report status information and reduces firewall impedance.

SUMMARY OF THE INVENTION

It is in view of the above problems that the present invention was developed. The invention is a system and method using e-mail protocols for a return path for command and control interactivity with outlying receiver sites. The system and method support monitoring of a receiver network by providing an email return path for receiver status information. An integrated receiver decoder receives a command. The integrated receiver decoder identifies a return path from the command, generates an encoded report, and attaches the encoded report to a reply email which utilizes the return path. The reply email is sent to an email server over a computer network. The email server deciphers the encoded report, stores the data, may generate a human readable file, and may route the e-mail to a processor for further action.

The system and method support sending an email to a central control system when an alarm condition occurs within an outlying receiver. A processor within the outlying receiver iteratively checks for an alarm condition. Upon happening of an alarm condition, the processor generates an email using a stored email address, attaches status information to the email, and sends the email to an email server at the central control station over a computer network. The email server deciphers the encoded report, stores the data, may generate a human readable file, and may route the e-mail to a processor for further action.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 4 is an illustration of sending outlying receiver information using a return path;

FIG. 5a is a diagram of the general frame structure of the command;

FIG. 5b is a diagram of the general frame structure of the report; and

FIG. 6 is an illustration of an alternative method of sending outlying receiver information using a return path in the event of an alarm condition.

DETAILED DESCRIPTION OF THE PREFERRED EMBODIMENTS

Figure 1:
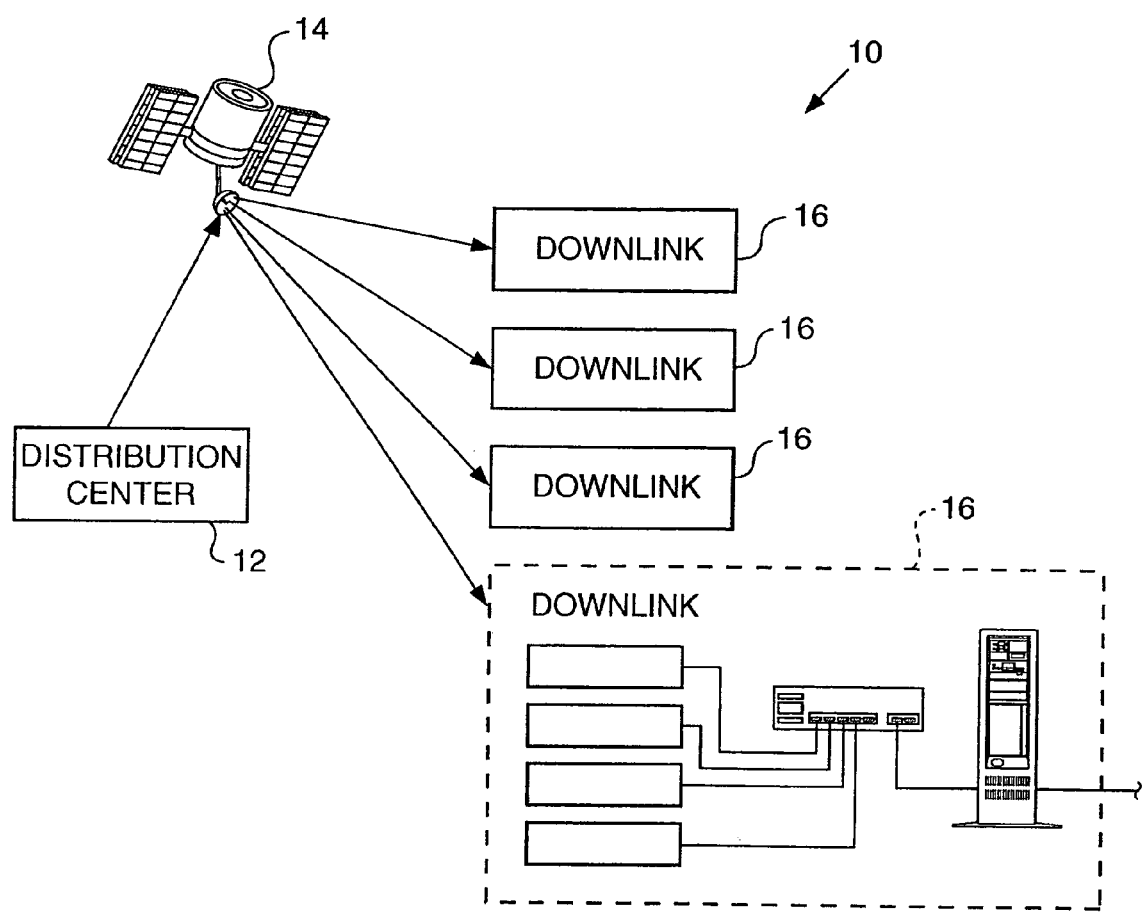
FIG. 1 is a diagram of a point to multipoint satellite network illustrating a transmission uplink, a satellite and several remote receiver downlinks.

Referring to the accompanying drawings in which like reference numbers indicate like elements, FIG. 1 illustrates a typical satellite point to multipoint network 10 wherein the point is referred to as an uplink or distribution station 12 and the multipoints are called downlinks 16 with the equipment at each downlink 16 referred to as remote equipment, a remote location, or an integrated receiver/decoder. In the satellite control network 10, control information is generated at the distribution station 12 and transmitted via a satellite 14 to the downlinks 16. Control information is generated at the distribution station 12, fed to various conditioning and modulation circuits (not shown) and combined with other signals in a combiner (not shown). These other signals may be video signals or audio signals fed through an audio modulator to the combiner. These combined signals are transmitted by a transmitter (not shown) to a particular satellite on a particular frequency. The transmitted signal is retransmitted by the satellite 14 back to locations within a particular geographic footprint area. Devices in this area, using the appropriate receiver antenna and other equipment, may reconstitute and use the transmitted signal or signals. Using multiple satellites enables the signals to be retransmitted to any desired geographic areas. Satellite to multiple point networks are well known in the art. U.S. Pat. No. 4,985,895 to Pelkey describes a typical network and is hereby incorporated by reference in its entirety.

Figure 2:
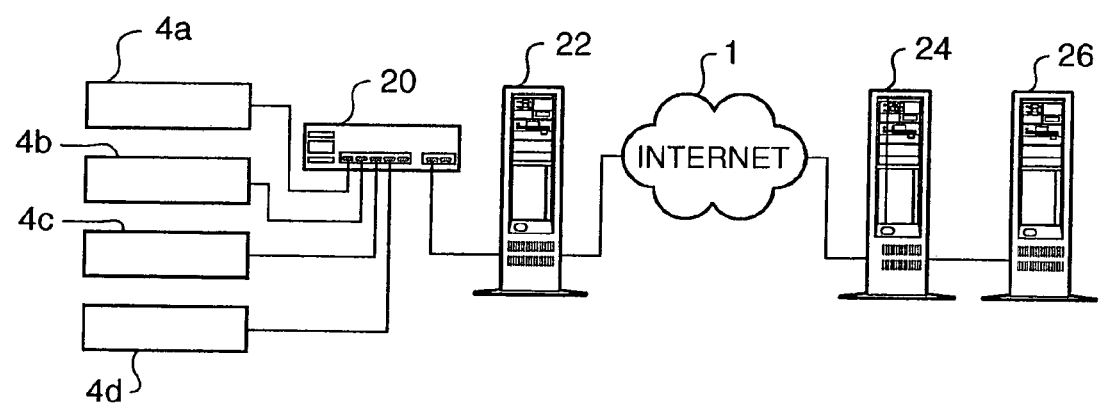
FIG. 2 is a diagram of a typical remote receiving unit and central control system.

FIG. 2 illustrates one of the remote locations 16. The remote location 16 includes integrated receiver decoders (IRD) 4a, 4b, 4c, and 4d. Each IRD 4 includes programming for analyzing commands and generating reply emails. While the IRD 4 performs these tasks with software programming, those skilled in the art would understand that these tasks could equally be accomplished through hardware. The remote location 16 also includes a router 20 which is connected to a computer network 1, such as the Internet, a Local Area Network (LAN), or a Wide Area Network (WAN). The router may be, as an example, a Netgear® (Netgear is a registered trademark of Bay Networks, Inc.) RT314 router. The router 20 can route message to the IRDs using any of numerous protocols. For example, each IRD 4 may be dynamically assigned an IP address from the router 20 using the Dynamic Host Configuration Protocol (DHCP) functionality. In the depicted embodiment, the remote location 16 also includes a firewall 22. The IRDs 4 are connected to the distribution station 12 via the router 20, the firewall 22, and the computer network 1. At the distribution station 12, an email server 24 is connected to a control server 26 and to the computer network 1, such as the Internet. The email server 24 and the control server 26 are UNIX based in the depicted embodiment. While the email server 24 and the control server 26 are shown individually, those skilled in the art would understand that the devices may be combined in one unit. The email server 24 includes programming for processing emails from the IRDs 4. While in the depicted embodiment the email server 24 performs these tasks with software programming, those skilled in the art would understand that these tasks could equally be accomplished through hardware.

In the depicted embodiment, a command is transmitted to the IRD 4 and the IRD 4 responds by sending an email message over the computer network 1 to the distribution station 12. Typically, commands are transmitted to the IRD 4 via the satellite 14. The distribution station 12 may send a command, for example, that tells the IRD 4 to close a relay or tune to another frequency. In the depicted embodiment, a command is transmitted to the IRD 4 to send an email to the distribution station 12, wherein that command includes an email address and an IP address. The command may simply be "REPORT" to confirm execution of a command or to report unit operating status. Additionally, the IRD 4 may be commanded to send no report at all. For example, if a NULL command is transmitted to the IRD 4 in which the email address portion of the command has an undefined value, the IRD 4 will not send a report until it has a defined value for the email address.

Conventionally, the uplink 12 transmits, among other things, commands through the use of a packet. FIG. 5a illustrates generally a satellite transmission packet 40. The packet 40 includes a vendor identification ("VEN-ID") 42, a system identification ("SYSTEM-ID") 44, a length indicator ("LEN") 46, a remote address ("REMOTE-ADDR") 50, a device address ("DEV-ADDR") 52, COMMAND 54, DATA 56, and CHECKVAL 58. In FIG. 5a, the numerals below each field indicate the allocated number of bytes for each variable. For example, VEN-ID and SYSTEM-ID each contain four bytes. The vendor identification 42 identifies the particular manufacturer of the IRD 4. The system identification 44 identifies the particular version of the IRD 4. The length indicator 46 indicates the length of the packet 40. The remote address 50 field specifies which remote devices, such as the IRD 4, are to process the packet. The device address 52 specifies the particular device within the remote device, such as the IRD 4, to which the command is directed. The COMMAND 54 field of the packet 40 provides the instruction to the IRD 4 to send the report. The DATA 56 field of the packet 40 contains data associated with the command, such as the email address and IP address of where to send the report. The CHECKVAL 58 field is appended to the end of the packet and provides a value for error checking. The use data packets in satellite transmission is well known in the art and, therefore, not described in more detail.

While a command may trigger the IRD 4 to send a report, other events may also trigger the IRD 4 to send an email to the distribution station 12. For example, an alarm condition could trigger the IRD 4 to send an email. An alarm condition can occur if, for example, no satellite signal is received, a signal is received but it does not contain a data stream, or if the satellite signal is too strong or too weak. The IRD 4 may iteratively or periodically check for an alarm condition. In another method, the IRD 4 builds a log of parameter information for a specified period of time, say a day, a week, or a month, and sends the log to the distribution station 12 when the period of time has lapsed.

Still another method may include a trigger based on a local event. For example, a user could press a button on the front panel of the IRD 4 which triggers the email to be sent. In another example, a email message may be sent upon a user accessing a media file from the IRD's memory, such as a hard drive. In this last example, media files, such as audio or video files, are stored in memory and when a user accesses one of the media files, an email message is sent reporting information, for example date and time, regarding the access.

In the depicted embodiment, the control server 26 at the distribution station sends a command via the satellite 14 to one or more IRDs 4. The command may be transmitted to an individual IRD 4, a group of IRDs, or all IRDs. A group is defined as several devices within a portion of the network that can be commanded to perform a function simultaneously. For example, the control server 26 could send a command to all West Coast IRDs except San Francisco. However, commands may be transmitted by other methods. For example, the control server 26 could send a command to one or more IRDs 4 through the computer network 1. In this method, IRDs could be identified using a Media Access Control (MAC) address or an IP address.

Once the IRD 4 receives the command from any source, it sends an email to the email server 24 using the Standard Mail Transfer Protocol (SMTP) over the computer network 1. This method has great advantages in that provides a process for firewall penetration that uses current infrastructure and standard security protocols. Moreover, the method spools email messages such that extensive hardware is not required for contemporaneously receiving a multitude of messages. Spooling, as is known in the art, queues the email messages for later processing. Through spooling, the huge processing demands of simultaneously receiving voluminous satellite transmitted signals is avoided.

Another method which also has these advantages is to transmit via satellite the email from the IRD 4 to the email server 24 at the uplink 12. However, this method would require the IRD 4 to include additional hardware, specifically a transmitter.

Figure 3:
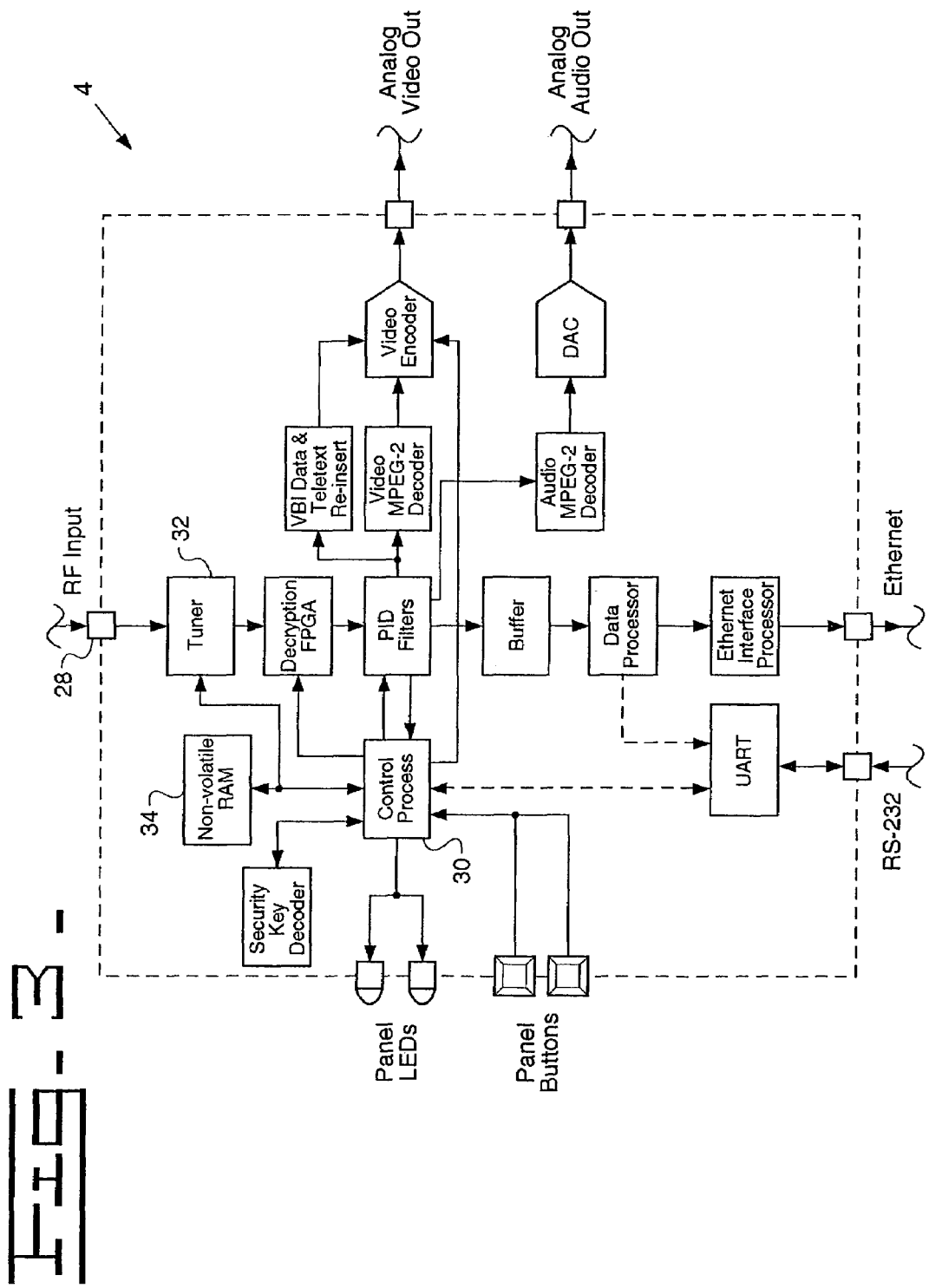
FIG. 3 is an illustration of a typical integrated receiver decoder.

Referring to FIG. 3, a diagram of a typical IRD 4 is shown that includes, among other things, an RF input 28, a microprocessor 30, a tuner 32, and a memory device 34, such as a non-volatile random access memory (NVRAM). Digital data is passed from the RF input 28 to the microprocessor 30. The microprocessor 30 processes any commands within the digital data. When a command to report is received, the microprocessor 30 identifies the email address and IP address transmitted with the command and stores these items within the NVRAM 34. The NVRAM 34 also includes the software logic for generating an email and/or recognizing an alarm condition. The NVRAM 34 stores parameter information which may be used to generate a report providing status information.

FIG. 4 is a general flow chart illustrating a method of operation. In a first step 100, a command, including data providing a return path, is transmitted to the IRD 4. Typically, the data includes an email address and an IP address. While only one receiver is discussed, those skilled in the art would understand it would be possible for several IRDs to simultaneously be in operation and respond to commands. The command may be transmitted by an email server over a computer network but is relayed to the IRD 4 via satellite 14 in the depicted embodiment. After the IRD 4 receives the command, the microprocessor 30 processes it to identify the email return path in a step 110. The IRD 4 then generates a reply email which is addressed using the return path information in a step 120. In a step 130, the IRD 4 generates a report. The report can include various parameters of the IRD 4 such as unit information, tuner information, carrier settings, network controller information, video decoder information, audio decoder information, group membership, and alarm conditions. The email carrying the report response will have a "From" field of sssssss@fixedstring.com, where the "sssssss" user account-name is the IRD serial number and the "fixedstring" portion of the domain-name is a pre-set string stored in the NVRAM 34. The beginning of the report includes a header. The end of the report includes two characters appended for error checking.

The report may include various information, such as status information, of the IRD 4. Various IRD parameters are stored within the NVRAM 34. These parameters keep track of the various conditions and functions of the IRD 4 as well as unit identification information. A typical report will include all IRD 4 setup information and status data of the various parameters. The IRD 4 can store at least forty different parameters and parameters may be arranged by group. Typical groups include: unit information, tuner information, carrier settings, search and acquisition information, network controller information, video decoder data, audio decoder data, relay settings, group membership information, and RF Switch/LNB settings.

Because email messages must be text and not binary information, the status information must be encoded before it is attached to the email message. In one method, the IRD 4 encodes the report using a UUencode/UUdecode algorithm; however, other encoding algorithms, such as MIME-64, may be used. UUencode is a software utility that converts a binary file to an ASCII file so that it can be sent as an attachment to an email message. When the message is received, the recipient runs UUdecode to convert it to the original file. Similarly, MIME-64 is an encoding algorithm, described in Internet Engineering Task Force RFC1341, herein incorporated by reference. RFC1341 was written by N. Borenstein and N. Freed and published in June 1992. MIME-64 has one advantage over Uuencode/Uudecode in that it allows for the conversion of larger messages.

After encoding, the text file is attached to the reply email in step 140, and the IRD 4 then sends the reply email to the email server 24 in step 150. The email server 24 receives the reply email and status information in step 160. In step 170, the email server 24 stores the email and status information. The email server 24 extracts the binary information, and generates a human readable file in step 210, such as an Hyper Text Markup Language (HTML) file, detailing the status of the IRD.

In an optional step 180, the email server, or another computing device, will analyze the extracted binary information. The analysis could be carried out either through software or hardware programming. In some embodiments, the analyzing device will decide to perform some function based on the analysis. For example, the control server 26 sends a command out to all IRDs 4 within a certain geographic area, say Central Illinois, to send back a report. At the time of transmitting the command, all IRDs 4 within Central Illinois are supposed to have a certain configuration, such as tuned to a certain channel, perhaps channel 2 for example. The email server 24 receives and analyzes a report from each IRD 4. The email server 24 determines through its analysis that one of the IRDs 4 has a variant configuration, such as tuned to channel 1. The email server 24 relays this data to the control server 26, and the control server 26 sends a command to the errant IRD 4 to tune to channel 2. The process of analyzing and sending a corrective command provides an easy method of system self correction. As another example, the email server could display a message on a monitor or print out a report upon analyzing a report in order to notify a human network monitor of certain events.

In an optional step 190, the email server 24 will analyze the report to determine whether an alarm is indicated. Thereafter, the email server 24 will generate an alarm report as indicated in step 200 or a standard report as indicated in step 210. Step 220 indicates the end of the process.

In one embodiment, the control server 26 sends a command to a group of IRDs 4. Some time later, the control server 26 verifies with the email server 24 that all of the commanded IRDs 4 have reported. If an IRD is tardy, the control server 26 sends a second request to the tardy IRD. The control server 26 repeats this process until all of the commanded IRDs 4 report back. Thereafter, the control server 26 or the email server 24 sorts out and discards redundant messages.

FIG. 5*b* illustrates the order and content of the report 60 attached to the email message. The report 60 contains a header, data 74, and an error checking factor 76. The header contains several fields including: ARLRSRPT_HEADER_ID 62, SERIAL_ID 64, NUM_BYTES 66, FLAGS 68, REPORT_FORMAT 70, REQUEST_ID 72, and a field reserved for future use. In FIG. 5*b*, the numerals below each field indicate the allocated number of bytes for each variable. For example, ARLRSRPT_HEADER_ID 62 and SERIAL_ID 64 each contain four bytes. The ARLRSRPT_HEADER_ID 62 indicates the IRD brand of manufacture. The SERIAL_ID 64 is a variable containing the IRD's serial number. NUM_BYTES 66 is the number of bytes the report contains including the two byte error checking variable, but it does not include the header. The FLAGS 68 field indicates whether the report was sent because of a command by the control server 26 or because of an alarm or boot-up condition. REPORT_FORMAT 70 indicates the specified protocol used for generating the data which describes stored parameter values of the IRD 4. If the control server 26 transmitted a command to the IRD 4, the command will include an identifier for the control server, and the IRD 4 includes this identifier as REQUEST_ID 72 in the report. The data 74 is attached after the header. The data 74 includes status information for one or more parameters of the IRD 4. After the data 74 is attached, the error checking variable 76 is attached to the end of the report. One method of error checking is by way of a CRC-16 calculation, a powerful method for detecting errors in the received data which is well known in the art.

In a second alternative method shown in FIG. 6, the IRD 4 generates an email and sends it to the email server 24 upon the happening of an alarm condition. In a step 300, the microprocessor 30 is reset. The main program is started in step 310 and initialized in step 320. The microprocessor 30 decides whether there is an alarm condition in step 330. If so, the microprocessor 30 identifies the alarm in step 380, generates an email in step 400, and attaches status information in step 410. In step 420, the IRD 4 sends the email with the status information to the email server 24. After the email is sent, the microprocessor continues executing the program in step 340. A counter in step 350 sends an interrupt signal to the microprocessor 30 after a specified time period. When the microprocessor 30 receives the interrupt signal, it again checks for an alarm condition in step 330. The microprocessor 30 repeats this process until it is powered off in step 360. A full status report will be sent anytime an alarm condition remains active for more than ten seconds. The main program includes logic such that status reports are sent no more often than once every five minutes in order to limit network traffic. The integrated receiver decoder 4 includes a real time clock which is used to time stamp when an alarm condition began, how long it has continued and when the status report was last sent. When a report is sent due to an alarm condition, the FLAGS 68 field indicates such in the report header.

In a third alternative method, the control server 26 identifies and selects one or more IRDs 4 to receive one or more commands. The control server 26 selects the IRDs 4 based on IP addresses or group membership. The control server 26 then sends a command to the selected IRD 4. The selected IRD 4 processes the command. The IRD 4 executes the transmitted command and sends a reply email to the email server 24 at the distribution center 12 to confirm execution of the command. This method may be used for remote diagnostics.

In yet another embodiment, the network device is a wireless telephone. The control server 26 sends a command to one or more wireless telephones. The wireless telephone generates and sends an email containing status information to the email server 24. In this last embodiment, the wireless telephone may be a vehicle service system such as OnStar® (Onstar is a registered trademark of General Motors Corporation) wherein the vehicle service system on command sends back an email reporting status information of the vehicle.

In still another embodiment, the network device is industrial equipment, such as a Heating Ventilation and Air Conditioning (HVAC) unit, a refrigeration unit, a building management device, a machining center, or similar equipment. For example, a large complex may have several buildings each with an HVAC unit. Similarly, a complex may have several refrigeration units spread out through the complex. These units could be commanded to send an email with a status report for each HVAC and/or refrigeration unit. As another example, a call service company for building management, such as ADT® (ADT is a registered trademark of ADT Services AG), has a network of devices for monitoring building systems, such as a fire alarm, a burglar alarm, or similar system. A command could be transmitted from the call service company to each monitored system, and the monitored system could send back a status report. In yet another example, machining centers are often linked by a network to a central control system for the purpose of transferring Computer Aided Manufacturing (CAM) files. The central control system could command each machining center over the network to send back an email reporting machine status and/or progress on a particular machined component.

In view of the foregoing, it will be seen that the several advantages of the invention are achieved and attained. A key advantage of the invention is that it allows network devices to be commanded to return status information using standard protocols and security measures.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the email server and the control server may be contained within one computing device. Thus, the breadth and scope of the present invention should not be limited by any of the above-described exemplary embodiments, but should be defined only in accordance with the following claims appended hereto and their equivalents.

What is claimed is:

1. A reporting apparatus for an integrated receiver decoder configured to receive content data transport streams, decode content data from the transport stream and output content data, said reporting apparatus comprising:
   a microprocessor;
   a radio frequency input interface;
   a computer network interface;
   a memory;
   said microprocessor, said radio frequency input interface, said computer network interface and said memory all being in operative communication;
   said microprocessor being configured to receive at least one data packet containing an e-mail return address through said radio frequency input interface, said e-mail return address being addressed a transmission controller, said microprocessor being further configured to store said e-mail return address in said memory;
   said microprocessor being further configured to periodically update at least one parameter, said parameter being an operational status of the integrated receiver decoder, and said microprocessor being further configured to store a current status of said at least one parameter in said memory;
   said microprocessor being further configured to write a report of said at least one parameter;
   said microprocessor being further configured to attach said report to an e-mail, said e-mail being addressed to said e-mail return address, said e-mail return address being recalled from said memory;
   said microprocessor being further configured to send said e-mail when a command in the data transport stream requests said e-mail.

2. The reporting apparatus of claim 1 wherein said computer network is the Internet.

3. The reporting apparatus of claim 1 further comprising a transmitter, said microprocessor being configured to send said e-mail with said report via a radio frequency transmission sent by said transmitter.

4. The reporting apparatus of claim 1 wherein said report includes unit information, tuner information, carrier settings, network controller information, video decoder information, audio decoder information, and group membership information, and an alarm condition.

5. The reporting apparatus of claim 1 wherein said microprocessor is further configured to include in said e-mail a "from" field.

6. The reporting apparatus of claim 5 wherein said from field includes a user account name.

7. The reporting apparatus of claim 5 wherein said from field includes an integrated receiver decoder serial number.

8. The reporting apparatus of claim 1 wherein said at least one parameter includes at least one of a unit parameter, a tuner parameter, a carrier setting, a network controller parameter, a video decoder data, an audio decoder data, a relay setting, a group membership parameter or an RF switch/LNB setting.

9. The reporting apparatus of claim 1 wherein said microprocessor further comprises a report encoder, said encoder using a UU encode algorithm.

10. A reporting apparatus for an integrated receiver decoder configured to receive content data transport streams, decode content data from the transport stream and output content data, said reporting apparatus comprising:
    a microprocessor;
    a radio frequency input interface;
    a computer network interface;
    a memory;
    said microprocessor, said radio frequency input interface, said computer network interface and said memory all being in operative communication;
    said microprocessor being configured to receive at least one data packet containing an e-mail return address through said radio frequency input interface, said e-mail return address being addressed a transmission controller, said microprocessor being further configured to store said e-mail return address in said memory;
    said microprocessor being further configured to periodically survey at least one alarm condition in said integrated receiver decoder, said at least one alarm condition having an operational threshold at which an alarm status is flagged;
    said microprocessor being further configured to write a report of said alarm status when said operational threshold of said alarm condition is met;
    said microprocessor being further configured to attach said report to an e-mail, said e-mail being addressed to said e-mail return address, said e-mail return address being recalled from said memory;
    said microprocessor being further configured to send said e-mail when said alarm condition survey indicates that at least one of said operational thresholds for said alarm conditions is met.

11. The reporting apparatus of claim 10 wherein said microprocessor is further configured with an alarm time out such that said reports of said alarm status are sent in said e-mail at a report period, said report period being longer than said periodic survey of said alarm conditions.

12. The reporting apparatus of claim 10 wherein said computer network is the Internet.

13. The reporting apparatus of claim 10 further comprising a transmitter, said microprocessor being configured to send said e-mail with said report via a radio frequency transmission sent by said transmitter.

14. The reporting apparatus of claim 10 wherein said microprocessor and said memory are configured to include in said report unit information, tuner information, carrier settings, network controller information, group membership information and said at least one alarm condition.

15. The reporting apparatus of claim 10 wherein said microprocessor is further configured to include in said e-mail a "from" field.

16. The reporting apparatus of claim 15 wherein said from field includes a user account name.

17. The reporting apparatus of claim 15 wherein said from field includes an integrated receiver decoder serial number.

18. The reporting apparatus of claim 10 wherein said report further includes at least one of a unit parameter, a tuner parameter, a carrier setting, a search and acquisition parameter, a network controller parameter, a video decoder data, an audio decoder data, a relay setting, a group membership parameter or an RF switch/LNB setting.

19. The reporting apparatus of claim 10 wherein said microprocessor further comprises a report encoder, said encoder using a UU encode algorithm.

20. A status reporter for an uplink, the uplink being configured to transmit a content data transport stream for satellite distribution to a plurality of integrated receiver decoders, said status report apparatus comprising:
   a microprocessor,
   a transmitter interface,
   a computer network interface, and
   a memory;
   said microprocessor, said transmitter interface, said computer network interface and said memory all being in operative communication,
   said microprocessor being configured to send to at least one of the plurality of integrated receiver decoders at least one data packet containing an e-mail return address, said e-mail return address being addressed to a server in operative communication with the uplink transmitter;
   said microprocessor being further configured periodically request a status report from at least one of the plurality of integrated receiver decoders;
   said memory being configured to store a last reported status for each of the plurality of integrated receiver decoders;
   said microprocessor being further configured to receive said status report via an e-mail through said computer network interface;
   said microprocessor being further configured to receive an alarm status report, the alarm status report being received through said computer network interface and to store the alarm status report in said memory; and
   said microprocessor being further configured to transmit a command in response to said receipt of one of the alarm status reports, said command being stored in said memory, and said microprocessor being further configured to direct said command in response to the alarm status report to the individual integrated receiver decoder from which the alarm status report was received, said direction being according to an identification of the sending integrated receiver decoder, said identification being included in said alarm status report.

21. The status reporter of claim 20 wherein said computer network is the Internet.

22. The status reporter of claim 20 wherein said computer network interface is further configured to spool incoming e-mails.

23. The status reporter of claim 20 wherein said microprocessor is further configured to receive the incoming status reports and to identify the incoming status reports according to a flag on each of the incoming status reports, said flag indicating whether the incoming status report was sent in response to a transmitted command for reports, or in response to an alarm condition.

24. The status reporter of claim 20 wherein said report further includes at least one of a unit parameter, a tuner parameter, a carrier setting, a search and acquisition parameter, a network controller parameter, a video decoder data, an audio decoder data, a relay setting, a group membership parameter or an RF switch/LNB setting.

25. A data structure for an integrated receiver decoder configured to receive content data transport streams, decode content data from the transport stream and output content data, said data structure comprising:
   an instruction to store an e-mail return address in a memory, the e-mail return address being received in at least one data packet containing an e-mail return address in a radio frequency transmitted content data stream, the e-mail return address being addressed a transmission controller,
   an instruction to store in a memory at least one parameter, said parameter being a current operational status of the integrated receiver decoder,
   an instruction to store at least one alarm condition in said integrated receiver decoder, each of said alarm conditions having a current alarm status and an operational threshold at which an alarm status is flagged, said alarm status being stored in a memory;
   an instruction to periodically review said alarm conditions;
   an instruction to review said current operational status of said parameter in response to a request for a status report;
   an instruction to write a parameter report of said at least one current operational parameter,
   an instruction to write an alarm report of said alarm status when said operational threshold of said alarm condition is met;
   an instruction to attach said alarm reporter parameter reports to an e-mail, said e-mail being addressed to said e-mail return address, said e-mail return address being recalled from said memory; and
   an instruction to send said e-mail when a command in the data transport stream requests said e-mail and to send said e-mail when said alarm condition survey indicates an operational threshold for an alarm is met.

26. The data structure of claim 25 wherein said parameter report includes unit information, tuner information, carrier settings, network controller information, video decoder information, audio decoder information, and group membership information, and an alarm condition.

27. The data structure of claim 25 wherein said parameter report further includes at least one of a unit parameter, a tuner parameter, a carrier setting, a search and acquisition parameter, a network controller parameter, a video decoder data, an audio decoder data, a relay setting, a group membership parameter or an RF switch/LNB setting.

28. The data structure of claim 25 wherein said alarm report includes unit information, tuner information, carrier settings, network controller information, video decoder information, audio decoder information, and group membership information, and an alarm condition.

29. The data structure of claim 25 wherein said alarm report further includes at least one of a unit parameter, a tuner parameter, a carrier setting, a search and acquisition parameter, a network controller parameter, a video decoder data, an audio decoder data, a relay setting, a group membership parameter or an RE switch/LNB setting.

* * * * *